(No Model.) 2 Sheets—Sheet 1.
J. D. BOWMAN.
APPARATUS FOR TESTING STEAM OR OTHER PRESSURE GAGES.
No. 398,815. Patented Mar. 5, 1889.

Attest,
Inventor,
John D. Bowman
by his attorney
Francis T. Chambers

N. PETERS. Photo-Lithographer, Washington, D. C.

(No Model.) 2 Sheets—Sheet 2.

J. D. BOWMAN.
APPARATUS FOR TESTING STEAM OR OTHER PRESSURE GAGES.

No. 398,815. Patented Mar. 5, 1889.

UNITED STATES PATENT OFFICE.

JOHN D. BOWMAN, OF ALTOONA, PENNSYLVANIA.

APPARATUS FOR TESTING STEAM OR OTHER PRESSURE GAGES.

SPECIFICATION forming part of Letters Patent No. 398,815, dated March 5, 1889.

Application filed February 19, 1886. Serial No. 192,501. (No model.)

*To all whom it may concern:*

Be it known that I, JOHN D. BOWMAN, of Altoona, Blair county, and State of Pennsylvania, have invented a new and useful Improvement in Apparatus for Testing Steam or other Pressure Gages, of which the following is a full and true description, reference being had to the accompanying drawings, which form a part of this specification.

The object of my invention is to provide means for testing pressure-gages by weighing the pressures to which they are subjected in testing upon a lever-scale, such as is used for weighing heavy substances, and to provide means for testing and regulating the accuracy of such scales. This I accomplish by connecting the pipe or conduit through which the fluid-pressure is transmitted to the gage or gages being tested with the upper part of a cylinder or chamber having a piston of known area fitting neatly in the lower part thereof, the said piston being supported by knife-edged bearings upon a lever, which in turn transmits any pressure brought to bear upon the piston to a graduated lever having a sliding weight, by which the pressure is weighed.

Reference being had to the drawings which illustrate my invention and show an apparatus embodying the same in what I believe to be the best and most efficient manner—

Figure 1:
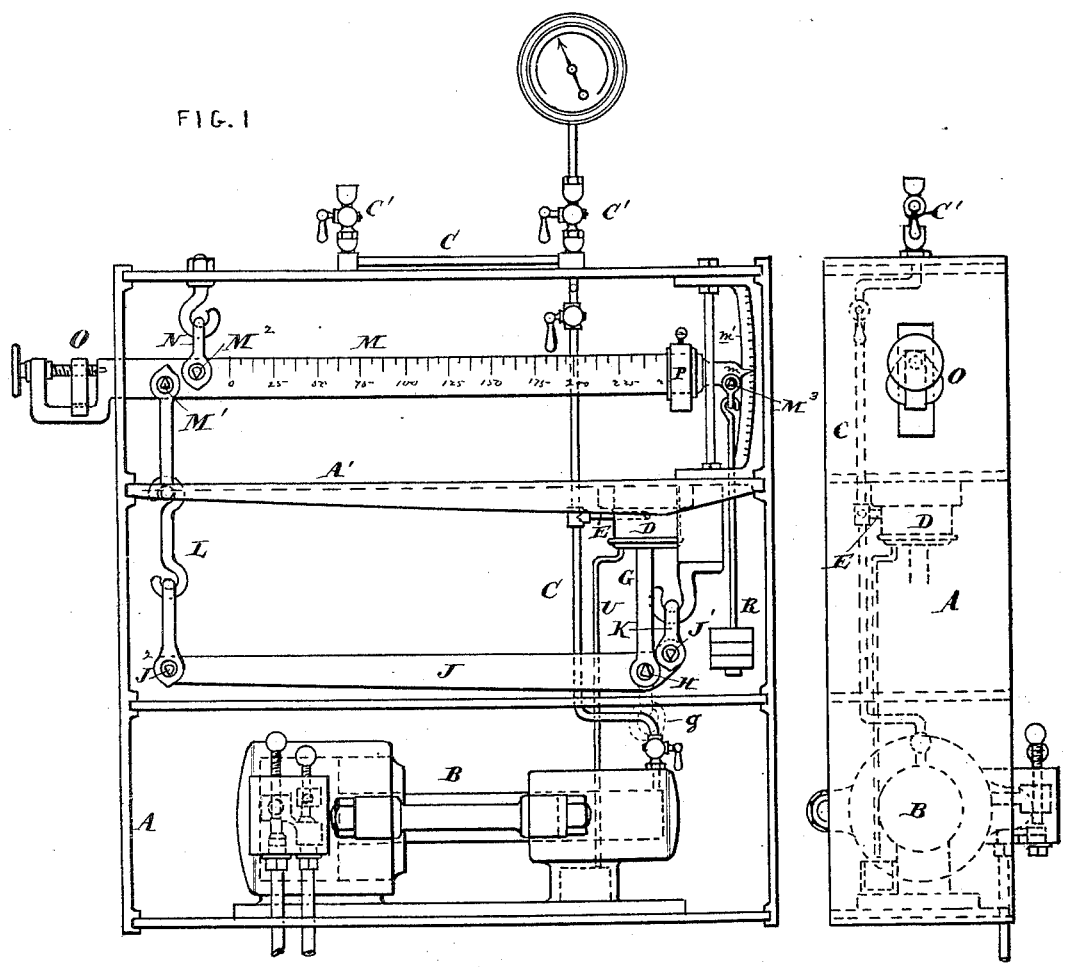
Figures 2, 3:
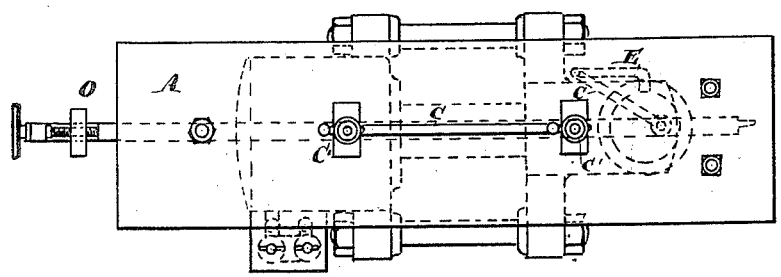
Figure 4:
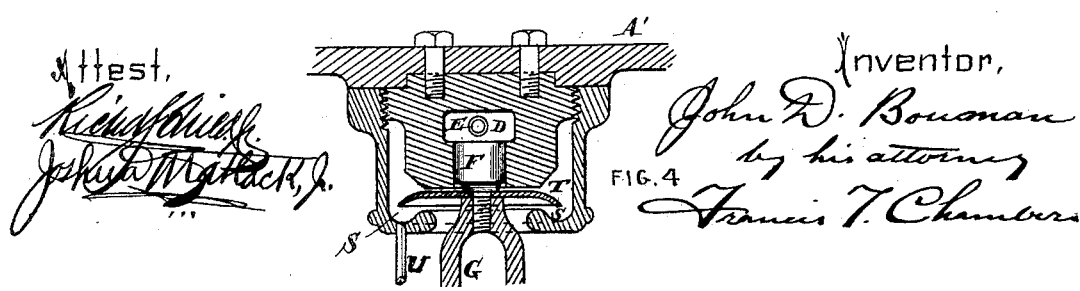
Figure 5:
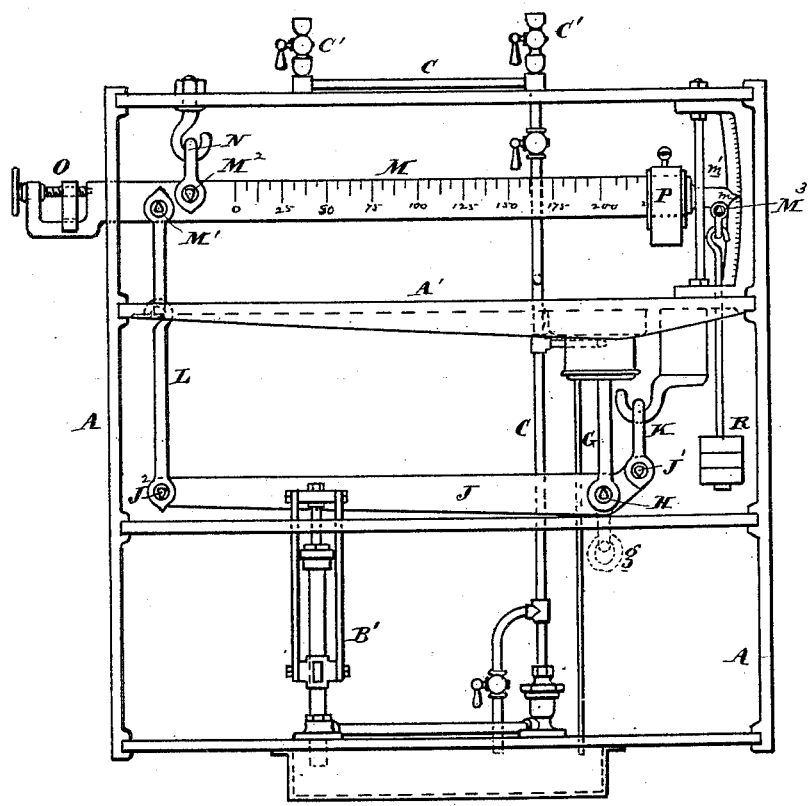
Figure 6:
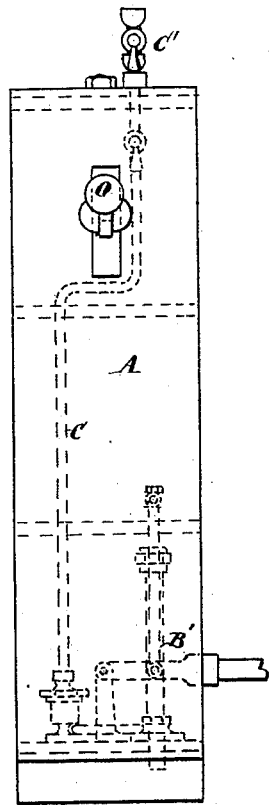
Figure 7:
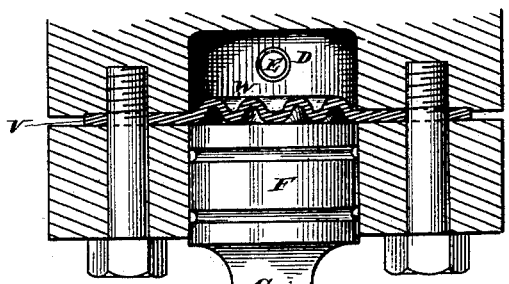

Figure 1 is a front elevation of my apparatus; Fig. 2, a plan view; Fig. 3, an end elevation; Fig. 4, a vertical section of the chamber having the piston upon which the pressure is weighed, and showing the device for catching leakage from the chamber. Fig. 5 is a similar view to Fig. 1, but shows a hand-pump combined with my devices, instead of the hydraulic accumulator shown in Fig. 1. Fig. 6 is an end elevation of Fig. 5, and Fig. 7 shows a device which I have employed to prevent leakage from the chamber around the piston, and an enlarged view of the end of the supporting-rod of the piston, and the knife-edge upon which it is supported.

A is the frame upon which my apparatus is supported.

A' is the cross-brace of the frame which supports the piston and its chamber, and should be made strong enough to resist bending or distortion.

B represents a hydraulic accumulator; and B', a hand-pump, by means of which the required pressure is put upon the fluid used for testing the gages.

C is the pipe or conduit leading from the pump to the gages.

C' are cocks to which the gages are secured when being tested.

D is a small chamber or cylinder secured to the framing A and connected with the conduit C by a pipe, E.

F is a piston of known area, made to fit neatly in the bottom of the chamber D, so that while it can move up and down in it without friction it at the same time closes the chamber and prevents almost all leakage.

G is a stout stiff straddle-rod which extends from the bottom of the piston F, and is supported upon knife-edges H, secured to a lever, J.

At the bottom of the piston-rod G, I provide a cross-bar, link, hook, or other device, $g$, from which a weight can be suspended, so that it will, through the rod G, bear upon the knife-edges H. The lever J is supported at one end by a link, K, upon which downwardly-turned knife-edges J' rest, and at its other end other downwardly-turned knife-edges, $J^2$, support it upon a rod or link, L, which in turn is suspended on upwardly-turned knife-edges M' of a graduated lever, M, which is suspended through its knife-edges $M^2$ upon a link or rod, N. The scale-beam or graduated lever M has a regulator, O, of ordinary construction, and a sliding weight, P, in addition to which it may be provided with a rod, R, suspended on knife-edges $M^3$, and upon which weights can be placed for weighing high pressures. At the extremity of the lever M is a pointer, $m$, which indicates the position of the lever on a small stationary scale, $m'$, it pointing to zero when the lever is perfectly balanced. When the chamber D and piston F are constructed as shown in Fig. 4, some leakage is likely to take place around the piston, and to prevent the fluid from running over the machinery I have devised the drip-catching appliances shown in Fig. 4, in which S is a metallic gutter supported around the outside of the cylinder D, as shown.

T is a saucer-shaped circular collar surrounding the rod G and having its depressed edge over the gutter S, so that any fluid escaping from D will flow over its convex surface and fall into the gutter, from which it flows into a drip-pipe, U, and is conducted to any convenient receptacle.

In Fig. 7 is illustrated a device which I have designed, and by using which leakage from the chamber D is entirely prevented. This consists of a metallic diaphragm, V, securely clamped over the bottom of the chamber D and having corrugations W, substantially as shown in the drawings. Against the bottom of these corrugations rests the piston F, and the diaphragm transmits to it the pressure of the fluid in the chamber with little or no diminution.

It will be observed that the piston F, in its relations to the combined levers and graduated scale, corresponds exactly to the platform of an ordinary weighing-scale, and the area of this piston being accurately ascertained as being, for instance, a square inch or known portion thereof, the scale is graduated to show the pressure per square inch to which the piston is exposed. The pressure per square inch upon the piston is of course the same as that to which the gages being tested are exposed, as the fluid in the conduit C communicates freely through the pipe E with the fluid in the chamber D, and any increase or diminution in the pressure affects the gages and the piston simultaneously. Whatever pressure there is upon the piston is transmitted directly to the lever J through its knife-edges H, and through the rod L to the graduated lever M.

In operating my apparatus the stop-cocks C' at the top of the conduit C are opened and the pipes pumped full of the liquid, which must be of such a nature as will not gum the piston—such, for instance, as alcohol, glycerine, or a mixture of glycerine and kerosene oil. This displaces the air in the pipes and leaves the piston F under what, for testing purposes, is the normal pressure. The sliding weight P is then brought to the zero-position on the lever M, and the levers and piston, with the liquid then supported thereon, are brought to a balance by means of the balancing-weight O back of the fulcrum. The gages to be tested are then secured to the cocks C' and the sliding weight moved forward to the point on the graduated scale indicating the pressure at which the gages are first to be tested, and the pressure is pumped up until the lever M is again perfectly balanced, which is indicated by the pointer $m$ rising to the zero-point on the stationary scale $m'$. The pressure indicated by the gages is then noted and compared with the weighted pressure upon the piston F and any variation corrected, the same steps being taken with each degree of pressure to which it is advisable to subject the gage. If at any time it is desired to test the accuracy of the apparatus, it may be done in the following simple way: The cocks C' are opened and the conduit pumped full of liquid. The apparatus is then brought to a balance, as before described; a known weight is then suspended from the cross bar or hook $g$, attached to the piston-rod G, so as to bear upon the knife-edges H; this will throw the levers out of balance, and the balance is restored by moving the sliding weight P along the scale. The weight then indicated by the scale is compared with the known weight and any variation noted and corrected.

If it is further desired to test the apparatus with pressure from the pump or accumulator, the sliding weight P may be placed at any point—say one hundred pounds—and the pressure pumped up till a balance is reached. A known weight—twenty pounds, for instance—is then suspended from $g$ and the sliding weight P moved along to the point indicating one hundred and twenty pounds, when the levers should again balance, and if they do not, the difference should be ascertained and corrected.

As will at once be seen, my apparatus may itself be used as a gage for high pressures in cases where it can be in a stationary position—for instance, with hydrostatic presses, accumulators, &c.—and arranged to act as a relief-valve by suitable mechanism where the pressure rises above that indicated by the position of the sliding weight P on the scale M.

The accumulator B or pump B' being directly beneath the scale, the operator can keep his hand upon the valve or handle, and by a slight pressure upon the valve or piston compensate for any leakage that may occur around the piston F.

The piston F and chamber D should be made of hardened steel and fitted with great accuracy, so as to move as nearly as possible without friction or allowing leakage.

Having now described my invention, what I claim as new, and desire to secure by Letters Patent, is—

1. In a gage-testing apparatus, substantially as specified, the combination of the chamber D, having piston F, supported on the scale-levers J M, with the fluid-conduit C extending above the piston and having at its top cocks C', to which the gages are attached.

2. In a gage-testing apparatus, substantially as specified, the combination of a force-pump, B', the fluid-conduit C, leading to the gages, a chamber, D, communicating with said conduit, the piston F, of known area, and the levers J M, arranged to support the piston and weigh the pressure on its surface.

3. In a gage-testing apparatus, substantially as specified, the combination, with the chamber D and piston F, of the annular gutter S, having drip-pipe U, with the saucer-shaped ring T, secured upon the rod G and having its depressed rim over the gutter S.

JOHN D. BOWMAN.

Witnesses:
A. W. MECHEN,
A. B. SWOPE.